US008849925B2

(12) United States Patent
Slavich et al.

(10) Patent No.: US 8,849,925 B2
(45) Date of Patent: Sep. 30, 2014

(54) SYSTEMS AND METHODS FOR CAPTURING ELECTRONIC MESSAGES

(75) Inventors: Nicholas Slavich, Somerville, MA (US); Aaron Siegler, Somerville, MA (US); Richard Tortora, Cambridge, MA (US); Cameron Mackenzie, Newton, MA (US)

(73) Assignee: Dexrex, LLC, Westford, MA (US)

( * ) Notice: Subject to any disclaimer, the term of this patent is extended or adjusted under 35 U.S.C. 154(b) by 581 days.

(21) Appl. No.: 12/773,302

(22) Filed: May 4, 2010

(65) Prior Publication Data

US 2011/0153755 A1    Jun. 23, 2011

Related U.S. Application Data

(60) Provisional application No. 61/288,499, filed on Dec. 21, 2009.

(51) Int. Cl.
G06F 15/16 (2006.01)
H04L 12/58 (2006.01)
G06Q 10/10 (2012.01)

(52) U.S. Cl.
CPC .............. *G06Q 10/107* (2013.01); *H04L 51/22* (2013.01); *H04L 51/16* (2013.01)
USPC .......................... 709/206; 709/207; 455/412.1

(58) Field of Classification Search
None
See application file for complete search history.

(56) References Cited

U.S. PATENT DOCUMENTS

| | | | |
|---|---|---|---|
| 6,807,565 B1 * | 10/2004 | Dodrill et al. ................. | 709/206 |
| 7,062,535 B1 * | 6/2006 | Stark et al. ..................... | 709/206 |
| 7,130,885 B2 * | 10/2006 | Chandra et al. ............... | 709/206 |
| 7,177,909 B2 * | 2/2007 | Stark et al. .................... | 709/206 |
| 7,237,009 B1 * | 6/2007 | Fung et al. ..................... | 709/206 |
| 7,299,263 B2 * | 11/2007 | Claudatos et al. ............. | 709/206 |
| 7,454,469 B2 * | 11/2008 | Zhou et al. .................... | 709/206 |
| 7,467,183 B2 * | 12/2008 | Arcuri et al. .................. | 709/203 |
| 7,533,149 B2 * | 5/2009 | Starbuck et al. .............. | 709/206 |
| 7,576,884 B2 * | 8/2009 | Kitahara et al. .............. | 358/1.16 |
| 7,593,995 B1 * | 9/2009 | He et al. ........................ | 709/206 |
| 7,610,345 B2 * | 10/2009 | Collins et al. ................. | 709/206 |
| 7,653,693 B2 * | 1/2010 | Heikes et al. ................. | 709/206 |
| 7,657,603 B1 * | 2/2010 | He et al. ........................ | 709/206 |
| 7,660,861 B2 * | 2/2010 | Taylor ............................ | 709/206 |
| 7,870,187 B2 * | 1/2011 | LaSalle et al. ................ | 709/203 |
| 7,890,875 B2 * | 2/2011 | Klassen et al. ................ | 715/758 |
| 7,899,871 B1 * | 3/2011 | Kumar et al. .................. | 709/206 |
| 7,933,860 B2 * | 4/2011 | Asselstine et al. ................ | 726/1 |
| 8,032,598 B1 * | 10/2011 | He et al. ........................ | 709/206 |
| 8,373,538 B1 * | 2/2013 | Hildner et al. ................. | 340/3.1 |

(Continued)

OTHER PUBLICATIONS

PCT Search Report for PCT/US2010/60651, dated Mar. 22, 2011.

(Continued)

*Primary Examiner* — Ninos Donabed
(74) *Attorney, Agent, or Firm* — Remenick PLLC

(57) ABSTRACT

A system and method of using the system for capturing and storing electronic messages is disclosed. The system includes a client device and a remote server in communication with the client device. The client device comprises a first processor, software running on the processor, a storage device, and a transmitter. The software captures electronic messages sent and received by the client device. The server comprises a processor, software running on the processor, a storage device and an output device. The software archives the electronic messages received from the client device.

15 Claims, 2 Drawing Sheets

(56) References Cited

U.S. PATENT DOCUMENTS

| | | | |
|---|---|---|---|
| 2003/0163537 A1* | 8/2003 | Rohall et al. | 709/206 |
| 2003/0167310 A1* | 9/2003 | Moody et al. | 709/206 |
| 2003/0177190 A1* | 9/2003 | Moody et al. | 709/206 |
| 2004/0010579 A1* | 1/2004 | Freese | 709/223 |
| 2004/0128356 A1* | 7/2004 | Bernstein et al. | 709/206 |
| 2004/0185875 A1* | 9/2004 | Diacakis et al. | 455/456.3 |
| 2005/0198389 A1* | 9/2005 | LaSalle et al. | 709/246 |
| 2006/0161631 A1* | 7/2006 | Lira | 709/206 |
| 2006/0168003 A1* | 7/2006 | Vau et al. | 709/206 |
| 2007/0242656 A1* | 10/2007 | Klassen et al. | 370/352 |
| 2007/0254711 A1* | 11/2007 | Young et al. | 455/558 |
| 2008/0028028 A1* | 1/2008 | Chismark | 709/206 |
| 2008/0102799 A1* | 5/2008 | Dholakia et al. | 455/412.1 |
| 2008/0180243 A1* | 7/2008 | Aaron | 340/540 |
| 2008/0207236 A1* | 8/2008 | Boerries et al. | 455/466 |
| 2008/0270491 A1* | 10/2008 | Nowacki et al. | 707/204 |
| 2008/0301207 A1* | 12/2008 | Demarest et al. | 707/206 |
| 2009/0307630 A1* | 12/2009 | Kawai et al. | 715/810 |
| 2009/0319624 A1* | 12/2009 | Buschi et al. | 709/206 |
| 2010/0145932 A1* | 6/2010 | Rook et al. | 707/722 |
| 2010/0318612 A1* | 12/2010 | Agarwal et al. | 709/206 |
| 2011/0215933 A1 | 9/2011 | Darling, IV et al. | |

OTHER PUBLICATIONS

Symantec, "IMlogic IM Manager," [online] published 2006 [retrieved Jul. 23, 2012], Retrieved from the Internet <URL http://i.bnet.com/whitepapers/Symantec_IM_Logic_Manager.pdf > entire document, especially p. 7, para 12; p. 8, para 1; p. 17, para 2.
PCT Patentability Report for PCT/US2010/60651, dated Mar. 22, 2011.

* cited by examiner

SYSTEMS AND METHODS FOR CAPTURING ELECTRONIC MESSAGES

REFERENCE TO RELATED APPLICATIONS

This application claims priority to U.S. Provisional Application Ser. No. 61/288,499, filed Dec. 21, 2009, entitled "Systems and Methods for Capturing Electronic Messages," which is hereby specifically and entirely incorporated by reference.

BACKGROUND

1. Field of the Invention

The invention is directed to systems for capturing electronic messages and methods of their use and, in particularly, methods and systems of capturing instant messages (IMs).

2. Background of the Invention

There are several methods of communicating via IM. The first scheme uses a centralized network in which subscribers are connected to one another through a series of network servers. The individual servers are linked together to form a large, centralized network. In this architecture, each server keeps track of the presence information and connections for each user connected to the network. When a subscriber sends a message, the server determines the location of the recipient's computer by contacting all of the other network servers and routes the message through the network servers until it reaches the recipient. This particular method is used by Microsoft Network (MSN®) Messenger IM service.

A second scheme of transmitting instant messages uses a peer-to-peer architecture favored by systems using ICQ protocol (pronounced "I seek you"), such as the Yahoo!®. Messenger IM service. In the peer-to-peer approach, the central ICQ server keeps track of which subscribers are currently online and records their Internet Protocol (IP)-based IM addresses. Once a subscriber logs on to the ICQ server, the ICQ server scans the subscriber's contact list and displays to the subscriber the Internet IM protocol address of every person on the contact list currently logged onto the IM server. When the subscriber wants to send a message to a recipient on the ICQ server, the subscriber simply selects the name of the recipient, types a message, and transmits the message. Because the ICQ client on the subscriber's computer has the Internet Protocol IM address of the recipient, the message is sent directly to the ICQ client residing on the recipient's computer without involving the ICQ server. This method has an advantage over the centralized network system because the messages do no travel through the entire network, which speeds the transfers of large files, such as documents and images because they are not slowed by network traffic.

When the conversation is complete, the subscriber exits the IM program, at which point the ICQ client on the subscriber's computer generates a message to the ICQ server to terminate the session. The ICQ client then sends a message to each ICQ client on the subscriber's contact list, that are currently logged onto the ICQ server, indicating that the subscriber has terminated his session.

A third method of transmitting instant messages is using a hybrid system that combines the centralized network approach with the peer-to-peer approach. America On Line's (AOL®'s) Instant Messaging (AIM®) service currently uses this method. The AOL® AIM® Service uses the centralized network approach for transmitting text messages and performing presence management. Because text messages are usually small, transmitting them over the network does not noticeably slow their delivery. However, for large files, such as document and images, AOL® AIM® service uses ICQ protocol to establish a peer-to-peer connection between the subscriber and the recipient of the message.

As the above described methods of communication are becoming more popular, the need to track and record conversations conducted via SMS, IM, etc. is increasing. Businesses often need to keep track of employee conversations for archival and compliance purposes. Thus, there is a need to capture, structure, and export such conversations into easily maintained and retrievable data records.

SUMMARY OF THE INVENTION

The present invention overcomes the problems and disadvantages associated with current strategies and designs and provides new systems and methods of capturing and recording electronic messages.

One embodiment of the invention is directed to a system for capturing and storing electronic messages. The system comprises a client device. The client device comprises a first processor, software executing on the first processor, a first data storage device coupled to the first processor storing electronic messages captured by the software, and a transmitter coupled to the first processor adapted to transmit the stored electronic messages. The software executing on the first processor captures electronic messages sent and received by the client device. The system also comprises a remote server in communication with the client device adapted to receive transmissions from the transmitter. The remote server comprises a second processor, software executing on the second processor, a second data storage device coupled to the second processor storing the archived electronic messages, and an output device outputting the stored, archived electronic messages. The software executing on the second processor archives the electronic messages.

In preferred embodiments there is a plurality of client devices. The client device can be one of a personal computer, a workstation, a mobile telephone, a personal digital assistant (PDA), a laptop computer, a smartphone, an iPhone®, a Blackberry®, a Wifi enabled device. In preferred embodiments, the client device further comprises a network interface card and a network monitor, wherein the network monitor captures messages. The software executing on the first processor can include a plug-in program to capture messages.

In the preferred embodiment, the client device further comprises at least one of a power source, an input device, and an output device and the server further comprises at least one of a power source, an input device, and an output device. In the preferred embodiment, the client device and the remote server communicate over a wireless network. The server can be a plurality of computer devices connected over a network. The plurality of computer devices can be connected remotely from each other.

Another embodiment of the invention is directed to a method of capturing and storing electronic messages received and sent by a client device. The method comprises the steps of capturing the new electronic messages sent or received by the client device, transmitting the new electronic messages to a remote server, archiving the new electronic messages, storing the structured electronic messages, and exporting the stored electronic messages to a location remote from the client device.

In the preferred embodiment, the method further comprises at least one of waiting for an IM event or deciphering network traffic for IM events. The method preferably further comprising establishing a TCP connection between the client device and the remote server. Messages are queued on the client device if a TCP connection is not established.

In the preferred embodiment, the new messages are transmitted in a message payload. The method preferably includes checking for duplicate messages. The stored electronic messages can be exported to a monitor, or as an electronic mail. Communications between the client device and the server are preferably via short XML messages. The communications between the client device and the server can be message uploads or server-client syncing data. In the preferred embodiment the method further comprises creating new message owner (handle, e.g. an alias for a user on a chat network) reference if such a reference does not exist.

Other embodiments and advantages of the invention are set forth in part in the description, which follows, and in part, may be obvious from this description, or may be learned from the practice of the invention.

DESCRIPTION OF THE DRAWINGS

The invention is described in greater detail by way of example only and with reference to the attached drawings, in which.

DESCRIPTION OF THE INVENTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

A problem in the art capable of being solved by the embodiments of the present invention is capturing and recording electronic messages received or sent by a device. It has been surprisingly discovered that installing software on devices or monitoring a network allows for the capturing and subsequent recording of electronic messages at a location remote from the device.

Figure 1:
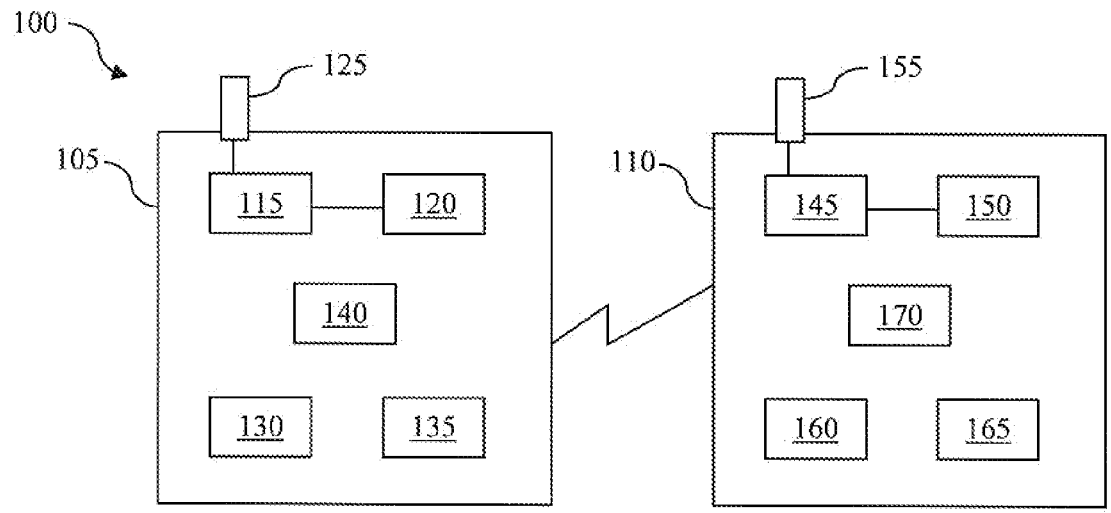
FIG. 1 is a schematic of an embodiment of the system of the invention.

FIG. 1 is a schematic of an embodiment of a system 100 of the invention. System 100 includes at least one client device 105 and at least one server 110. In the preferred embodiment, client device 105 and server 110 are in wireless communication with each other. For example, client device 105 and server 110 can communicate via, radio frequency (RF), LAN networks, WAN networks, WiFi, WiMax, Voice Over IP (VOIP) networks, satellite networks, Global System for Mobile Communications (GSM) networks, General Packet Radio Service (CPRS) networks, Code Division Multiple Access (CDMA) networks, Evolution-Data Optimized (EV-DO) networks, Enhanced Data Rates for GSM Evolution (EDGE) networks, 3GSM networks, Digital Enhanced Cordless Telecommunications (DECT) networks, Digital AMPS (IS-136/TDMA) networks, and Integrated Digital Enhanced Network (iDEN) networks. However, in other embodiments, mobile device 105 and server 110 can communicate over wired networks.

Client device 105 is a device capable of sending and receiving messages remotely. For example, client device 105 can be a personal computer, a workstation, a mobile telephone, a personal digital assistant (PDA), a laptop computer, a smartphone, an iPhone®, a Blackberry®, a WiFi enabled device. Each client device 105 has a processor 115. The functions of processor 115 can be provided by a single processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed herein, and random access memory (RAM) for storing results. Very large scale integration (VLSI) hardware embodiments, as well as custom VLSI circuitry in combination with a general purpose DSP circuit, may also be provided.

Processor 115 is in communication with a data storage device 120. Data storage device 120 is preferably a semiconductor-based memory (i.e. a flash memory device). However, other types of data storage devices can be used, for example, magnetic storage devices and optical storage devices. In the preferred embodiment, data storage device 120 is a fixed storage device. However, in other embodiments removable storage devices can be used. Data storage device 120 can retain data necessary for the functioning of client device 105, incoming or outgoing message data, and/or software that can be executed by processor 115. Additionally, processor 115 is in communication with a transmitter 125. Transmitter 125 is a device capable of transmitting messages from client device 105 to server 110. In the preferred embodiment, transmitter 125 is capable of bi-directional communications. In the preferred embodiment, transmitter 125 is the same device client device 105 uses to send and receive messages. However, in other devices, transmitter 125 is a separate device. Transmitter 125 can be capable of communication over one or more of the above mentioned networks. Transmitter 125 can include a network interface card. The incoming and outgoing network traffic routed through the network interface card is preferably monitored by a network monitor preferably at the Data Link Layer.

Other aspects of client device 105 can include a power source 130, an input device 135, and an output device 140. Power source 130 is a device capable of powering the client device 105. For example, power source 130, can be a battery, a solar cell, AC or DC power sources, biological power sources, fly wheels, wind turbines, and kinetic motion power sources. Input device 135 is a device capable of providing information to the client device 105. For example, input device 135 can be a key pad, a touch screen, and/or a voice activated device. Output device 140 is a device capable of providing information to a user. For example, output device 140 can be a screen, a printer, a sound producing device, and/or a vibration producing device.

Server 110 is a device capable of receiving data from client device 105, structuring the data, storing the data, and outputting the data as required. For example, server 110 can be a personal computer, a network of remotely connected computing devices (e.g. cloud computing), a series of computing devices connected over a network (e.g. a company network), and/or a portable computing device. In the preferred embodiment there are multiple servers 110. However, in other embodiments there can be just one server 110. In the preferred embodiment, server 110 has a processor 145. The functions of processor 145 can be provided by a single processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Processor 145 is in communication with a data storage device 150. Data storage device 150 is preferably a device able to store large amounts of data, for example, semiconductor storage devices, magnetic storage devices, and/or optical storage devices. In the preferred embodiment, data storage device 150 is a fixed storage device. However, in other embodiments removable storage devices can be used. Data storage device 150 can retain data necessary for the functioning of server 110, incoming or outgoing message data, and/or software that can be executed by processor 145. In the preferred embodiment there is one data storage device 150. However, in other embodiments, there is more than one data storage device 150. Additionally, processor 145 can be in communication with a receiver 155. Receiver 155 is a device capable of receiving transmissions from client device 105. In the preferred embodiment, receiver 155 is capable of bi-directional communications. Receiver 155 can be capable of communication over one or more of the above mentioned networks.

Other aspects of server 110 can include a power source 160, an input device 165, and an output device 170. Power source 160 is a device capable of powering the server 110. For example, power source 160, can be a battery, a solar cell, AC or DC power sources, biological power sources, fly wheels, wind turbines, and kinetic motion power sources. Input device 165 is a device capable of providing information to server 110. For example, input device 165 can be a key pad, a mouse, a touch screen, and/or a voice activated device. Output device 170 is a device capable of providing information to a user. For example, output device 170 can be a screen, a sound producing device, a printer, an emailing device, and/or a vibration producing device.

Figure 2:
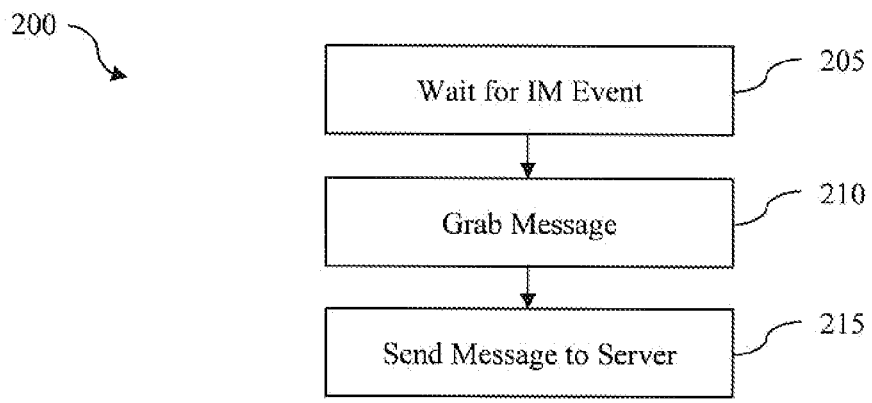
FIGS. 2 and 3 are flow charts of the client device side of embodiments of the methods of the invention.

FIG. 2 is a flow chart of the client device 105 side of an embodiment of a method 200 of the invention. In the preferred embodiments, software executing on processor 115 of client device 105 performs the steps associated with client device 105, while software executing on processor 145 of server 110 performs the steps associated with server 110. In the embodiment of FIG. 2, plug-in software connects directly to the IM software. This embodiment can be used, for example, with AIM Pro, AIM, Trillian Pro, and Pidgin clients. The plug-in can be installed during install-time and latches onto the existing IM software APIs (application programming interface). At step 205, the plug-in waits for an event from the IM software, telling the plug-in software that a message has been sent or received. Upon determination of an event, at step 210, the plug-in grabs the message and, at step 215, sends it to server 110. Captured messages can be stored in data storage device 120 of mobile device 105 for later transmission to server 110 or can be transmitted to server 110 upon capturing. For example, mobile device 105 can use an IP socket connection or another network to export the message.

Figure 3:
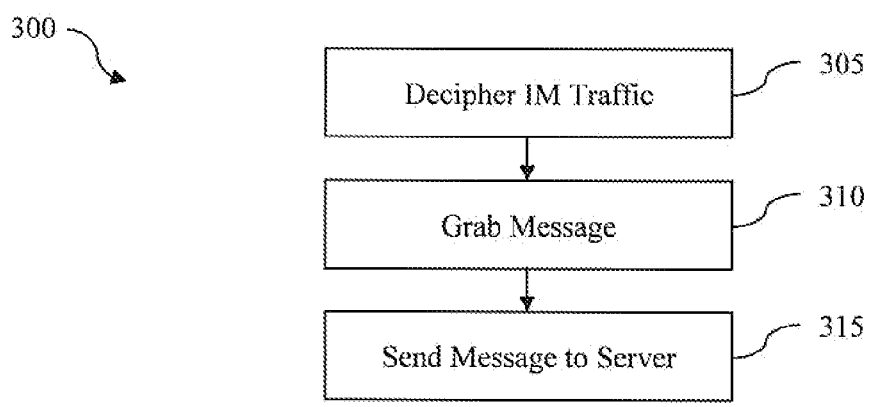

FIG. 3 is a flow chart of the client device 105 side of a second embodiment of a method 300 of the invention. In the embodiment of FIG. 3, the network monitor is used to listen to network traffic for incoming or outgoing IM traffic. This embodiment can be used, for example, with Disgby, Windows Live Messenger, MSN Messenger, Yahoo! Messenger, and AIM clients. At step 305, the network monitor listens to the Data-Link Layer on the network for incoming and outgoing IM traffic. At step 305, IM traffic is deciphered by looking for specific byte patters within the network data stream. When a message has been identified, at step 310, the network monitor grabs the entirety of the message from the network layer and reconstructs it. At step 315, the network monitor sends the message to server 110. Captured messages can be stored in data storage device 120 of mobile device 105 for later transmission to server 110 or can be transmitted to server 110 upon capturing. For example, mobile device 105 can use an IP socket connection or another network to export the message.

Figure 4:
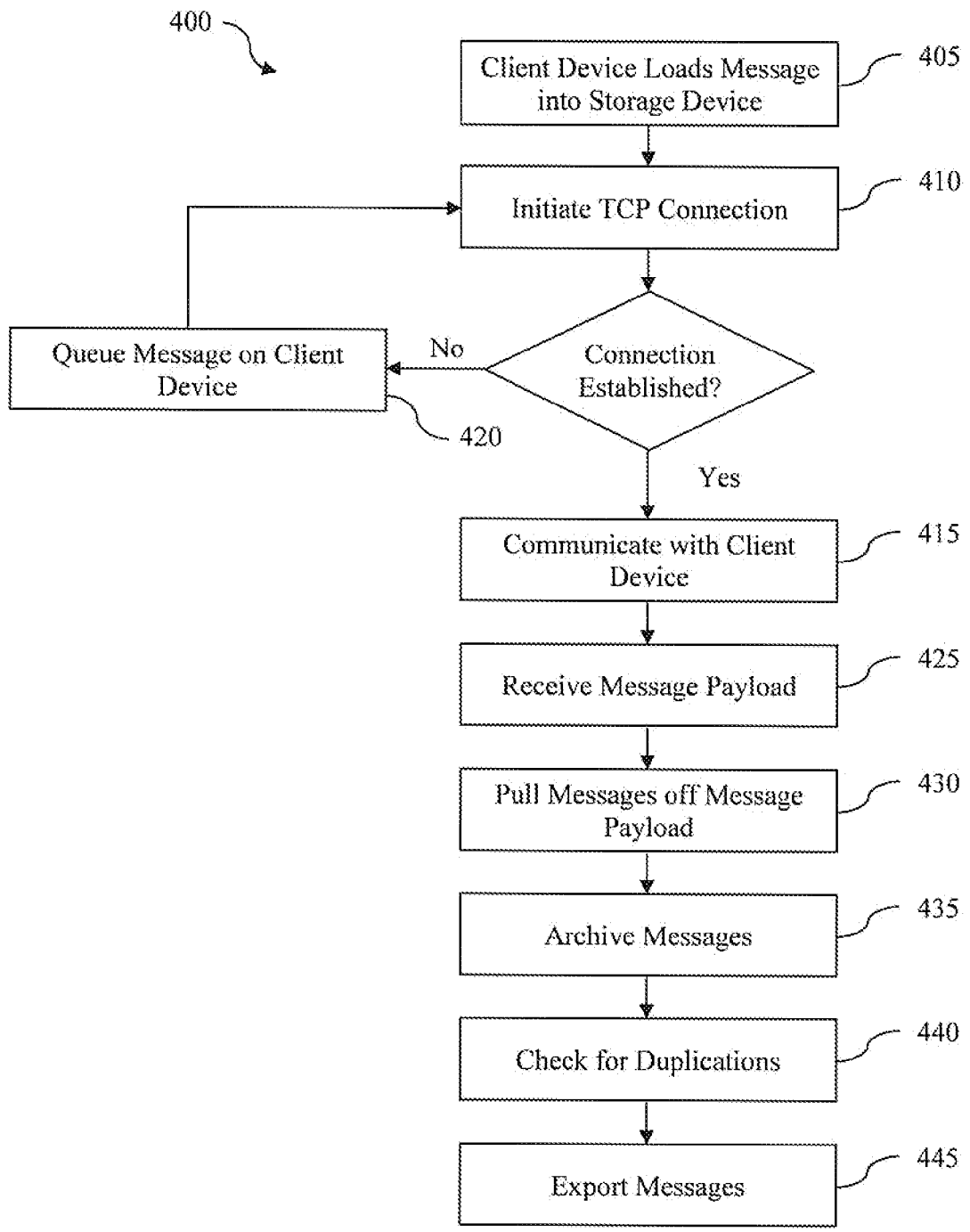
FIG. 4 is a flow chart of the server side of an embodiment of the method of the invention.

FIG. 4 is a flow chart of the server 110 side of an embodiment of a method 400 of the invention. When client device 105 receives a new message from the plug-in of the embodiment depicted in FIG. 2 and/or the network monitor of the embodiment depicted in FIG. 3, at step 405, it loads the message into data storage device 120. Client device 105, at step 410, attempts to initiate a TCP ("Transmission Control Protocol") connection with server 110 over secure http on a predetermined port. Once a secure TCP connection has been established, at step 415, client device 105 communicates with server 110. In the preferred embodiment, the communication is via short XML (Extensible Markup Language) messages. The messages, along with all pertinent message data, are parsed and XML encoded. The message content is preferably sent over base 64 encoded to ensure lossless transfer during transmission. Transmissions preferably occur over a secure http connection using 1024-bit or greater SSL (Secure Sockets Layer) encryption.

If a secure connection to the server cannot be established, at step 420, the messages are queued in data storage device 120 until a time when a secure connection can be made. In the preferred embodiment, the client can store tens of thousands of messages at a time. If at any time during the lifetime of the undelivered messages the system or client device is shut down, all messages are written to disk as backup to be uploaded when the system or client device is turned back on. Messages stored in this way are loaded into local memory immediately upon restart of the service or client device.

The XML communication between the client and server can expand and change as needed. There are at least four communications that can be transmitted through the protocol: client updates; time syncs; client notification messages; and message uploads.

Client updates compare the active version of the client's software to the version of the client software running on the client device. If it is determined that a client device is running out of date software, a new version of the client software is sent through the open connection. The client device preferably will install the new version of the software if it receives one during a client update Time syncs are intended to normalize the time between the client device time and the server time. This prevents tampering of the client device system clock, which would cause messages to be reported at different times than they actually occurred.

Client notification messages are messages that preferably include information to the controller of the device that message capture is occurring.

Message requests are used to upload messages to the server. A single message request can upload numerous messages at a time. Preferably, a single message request is for between 1 and 10 messages.

Referring to FIG. 4, at step 415, server 110 listens on a predetermined port, know both to client device 105 and server 110. Server 110 waits for incoming TCP connections from the client device's software. When a secure connection has been established communication between server 110 and client device 105 can begin.

At step 425, a collector service receives an XML message from the client device 105. If the XML message is anything other than a request containing IM/SMS message payloads, it parses the request and synchronously sends a response, otherwise it queues the IM/SMS message payload into local memory and sends a response to the client devices that the messages have been captured by the server. At step 430, a threaded application pulls messages off the message payload one-by-one and attempts to insert them into remote database storage. When a single message is pulled off the raw message queue, relevant screen name, workstation, and/or client data is pulled from the application's local cache. If data cannot be found in the cache then the database is queried to find the appropriate data, or lack thereof.

Before a message is inserted into remote database, every participant of the message must be determined, i.e. the sending handle (e.g. an alias for a user on a chat network), and all receiving handles. If a handle cannot be found, then a new handle representation is created in the database for future reference. For example, handles that have not been captured from a monitored device are created this way. If a client device reference cannot be loaded from the cache or from the database, a new reference can also be created.

At step 435, after the pertinent information related to the message has been loaded or created, the message is inserted into the remote database for archival. If there is an error in inserting the message or loading the data, the payload of the message and server communication is inserted into a log. This ensures messages can be recovered if the client device deletes the messages from local memory and the server is initially unable to insert the message into the database.

Once a message has been archived to the database, a duplication check is conducted at step 440. Duplicate massages can be a symptom of redundant message capture client-side. Since certain message protocols can be captured through network monitoring and through the plug-in redundant messages occur often. To ensure lossless capture both messages are uploaded to the server. A message is considered a duplicate if the message payload (the content of the message, not the encasing html markup) is identical and the message timestamp is within a predetermined period of time. The period of time is preferably less than one second. When a duplicate message is discovered, it is marked as such and is excluded from all reports and interfaces where messages are reported for review. In the preferred embodiment messages captured by the network monitor are considered duplicates while the messages captured by the plug-in (higher fidelity) are considered originals.

At step 445, the stored messages are exported. Exportation can be automatic (e.g. once a day, once a month, or after a certain number of messages have been stored) or on demand (e.g. upon request by a user). Additionally, exportation can be for a certain period of time, for a certain recipient/sender, or other collection. In the preferred embodiment, retrieval is via email. For example, the messages can be emailed in XML or plain text and sent in the body of the email or as an attachment. Additionally, the exported messages can be displayed on a monitor, outputted to a printer, or outputted to another device.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising" includes the terms "consisting of" and "consisting essentially of," and the terms comprising, including, and containing are not intended to be limiting.

The invention claimed is:

1. A system for capturing and storing electronic messages, the system comprising: a client device, the client device comprising:
    a first processor; software executing on the first processor, wherein the software executing on the first processor captures electronic messages sent and received by the client device, wherein the electronic messages are Short Message Services (SMS);
    a first data storage device coupled to the first processor storing electronic messages captured by the software;
    a transmitter coupled to the first processor transmitting the stored electronic messages;
    a remote server in communications with the client device and receiving transmissions from the transmitter, the remote server comprising: a second processor; software executing on the second processor,
    wherein the software executing on the second processor archives the electronic messages, checks for duplicate electronic messages based on each archived electronic message's payload and timestamp, wherein the electronic message is a duplicate if the message payload is identical and the message timestamp is within a predetermined period of time of less than one second, and marks the duplicate electronic messages;
    a second data storage device coupled to the second processor storing the archived electronic messages;
    an output device outputting the stored, archived electronic messages, excluding without deleting the duplicate electronic messages;
    wherein the outputting comprises emailing the stored messages in xml format to a user remote from the remote server; and wherein the server is a plurality of computing devices connected over a network.

2. The system of claim 1, wherein there are a plurality of client devices.

3. The system of claim 1, wherein the client device is one of a personal computer, a workstation, a mobile telephone, a personal digital assistant (PDA), a laptop computer, a smartphone, or a WiFi enabled device.

4. The system of claim 1, wherein the client device further comprises a network interface card and a network monitor, wherein the network monitor captures messages.

5. The system of claim 1, wherein the software executing on the first processor is comprised of a plug-in program to capture messages.

6. The system of claim 1, wherein the output is further at least one of to a printout or to a monitor.

7. The system of claim 1, wherein the client device and the remote server communicate over a wireless network.

8. The system of claim 1, wherein the plurality of computing devices are connected remotely from each other.

9. A method of capturing and storing electronic messages received and sent by a client device, the method comprising:
    capturing at least one electronic messages sent or received by the client device comprising software executing on a first processor, wherein the electronic messages are Short Message Services (SMS);
    storing the captured messages on the client device in a first data storage;

transmitting the at least one electronic messages, via a transmitter coupled to the first processor to a remote server in communication with the client device, wherein the server is a plurality of computing devices connected over a network;

archiving, via a second processor, the at least one electronic messages on the remote server;

storing the at least one archived electronic messages on the remote server, in a second storage device;

checking for duplicate electronic messages by comparing each archived electronic message's payload and timestamp with each other archived electronic message's payload and timestamp, wherein the electronic message is a duplicate if the message payload is identical and the message timestamp is within a predetermined period of time of less than one second;

marking the duplicate electronic messages;

exporting the stored electronic messages in xml format via email, excluding without deleting the duplicate messages, to a user remote from the remote server.

10. The method of claim 9, further comprising establishing a TCP connection between the client device and the remote server.

11. The method of claim 10, wherein messages are queued on the client device if a TCP connection is not established.

12. The method of claim 9, wherein the stored electronic messages are further exported to at least one of a printout or to a monitor.

13. The method of claim 9, further comprising at least one of waiting for a Short Message Service (SMS) event or deciphering network traffic for SMS events.

14. The method of claim 9, wherein the communications between the client device and the server are at least one of update requests, time requests, disclaimer notification changes, and message uploads.

15. The method of claim 9, further comprising creating new user reference if such a reference does not exists.

* * * * *